United States Patent
Teague

(10) Patent No.: US 8,608,246 B1
(45) Date of Patent: Dec. 17, 2013

(54) SAFETY BELT HOLDER

(76) Inventor: Adam Teague, Tulsa, OK (US)

( * ) Notice: Subject to any disclaimer, the term of this patent is extended or adjusted under 35 U.S.C. 154(b) by 129 days.

(21) Appl. No.: 13/286,787

(22) Filed: Nov. 1, 2011

(51) Int. Cl.
    *A47D 15/00* (2006.01)
(52) U.S. Cl.
    USPC ......... 297/481; 297/482; 297/484; 297/250.1
(58) Field of Classification Search
    USPC ........................................ 297/481, 482, 484
    See application file for complete search history.

(56) References Cited

U.S. PATENT DOCUMENTS

| | | | |
|---|---|---|---|
| 3,076,679 A | 2/1963 | Lorber | |
| 3,485,529 A | 12/1969 | Marling | |
| 4,645,231 A * | 2/1987 | Takada | 280/801.1 |
| 4,662,683 A | 5/1987 | Knoedler et al. | |
| 4,759,588 A * | 7/1988 | Husnik | 297/468 |
| 4,832,367 A * | 5/1989 | Lisenby | 280/808 |
| 4,946,198 A * | 8/1990 | Pittore et al. | 280/808 |
| 5,025,843 A | 6/1991 | Caulfield | |
| 5,061,012 A | 10/1991 | Parker et al. | |
| 5,080,396 A * | 1/1992 | Vacanti | 280/808 |
| 5,135,257 A * | 8/1992 | Short | 280/808 |
| 5,261,728 A * | 11/1993 | Carmichael | 297/482 |
| 5,979,983 A | 11/1999 | Galbreath | |
| 6,250,713 B1 | 6/2001 | Grohs et al. | |
| 6,305,745 B1 * | 10/2001 | Rijsdijk | 297/250.1 |
| 6,523,901 B2 * | 2/2003 | Smith | 297/392 |
| 6,789,851 B2 * | 9/2004 | Smith | 297/392 |
| 6,955,403 B1 * | 10/2005 | Weaver | 297/485 |
| 7,261,375 B2 * | 8/2007 | Godshaw et al. | 297/228.12 |
| 7,557,727 B2 | 7/2009 | Michida | |
| 7,971,908 B2 * | 7/2011 | Hathaway et al. | 280/808 |
| 2011/0133528 A1 | 6/2011 | Keith et al. | |
| 2011/0291459 A1 * | 12/2011 | Bruce et al. | 297/483 |

\* cited by examiner

*Primary Examiner* — David Dunn
*Assistant Examiner* — Alexander Harrison
(74) *Attorney, Agent, or Firm* — Head, Johnson & Kachigian, P.C.

(57) ABSTRACT

A safety belt holder for holding a safety belt out of a seat associated with the safety belt, the safety belt holder comprising a first part and a second part. The first part comprises an attachment device for attaching the first part to a structure adjacent the seat, a body attached to the attachment device, and a connector first side attached to or embedded within the body. The second part is attachable to the safety belt and comprises a connector second side, which is removably attachable to the connector first side. In particular, the safety belt holder is suitable for use with an infant car seat with a five-point harness and a retractable handle.

16 Claims, 5 Drawing Sheets

SAFETY BELT HOLDER

CROSS REFERENCE

Not Applicable.

BACKGROUND OF THE INVENTION

1. Field of the Invention

This invention relates generally to a safety belt holder, and more particularly, but not by way of limitation, to a magnetized safety belt holder for use with an infant car seat with a collapsible handle, an infant carrier, or a child stroller.

2. Description of the Related Art

Infant car seats often utilize a five-point harness safety belt, whereby two straps, one on each side of the child and each anchored at both ends on the same side of the child, extend over the child's shoulders, and buckles that are slideably attached to the straps buckle into a receiver located between the child's legs. An additional buckle typically attaches the two straps to each other at the child's chest.

The problem with such car seats is that the safety belt typically lies in the middle of the car seat when not in use, at exactly the point where the child will be placed. Thus, in placing a child in the car seat, a user must place the child on top of the safety belt then reach below the child to retrieve the safety belt for buckling. This can be uncomfortable for the child and difficult for the user. The same problem is frequently encountered in non-car seat infant carriers and in child strollers.

Infant car seats often double as carriers, and thus have a collapsible handle extending from the sides thereof such that the handle may be extended upward for carrying or downward for use as a car seat. Non-car seat infant carriers often likewise have such a handle, and strollers often have bars such as those constituting the frame of the stroller similarly located to either side of the seat portion of the stroller.

It would be desirable to temporarily attach the safety belts of an infant car seat, infant carrier, or child stroller to the handle or other device to the side of the seat while placing the child in the seat to keep the safety belts out of the way.

SUMMARY OF THE INVENTION

In general, in a first aspect, the invention relates to a safety belt holder for holding a safety belt out of a seat associated with the safety belt, the safety belt holder comprising a first part and a second part. The first part comprises an attachment device for attaching the first part to a structure adjacent the seat, a body attached to the attachment device, and a connector first side attached to or embedded within the body. The second part is attachable to the safety belt and comprises a connector second side, which is removably attachable to the connector first side.

The attachment device may be a hook. The hook may be sized and shaped such that it may slide along the structure but cannot rotate freely upon the structure. The hook may have a projection forming a groove such that the body may attach to the hook via a hook attachment device that fits within the groove such that the hook attachment device cannot slide along the hook. The hook attachment device may be a fabric loop.

The safety belt holder may further comprise a retractable attachment device such that the body attaches to the attachment device via the retractable attachment device, where the retractable attachment device may be extended such that the body is a longer distance from the attachment device or may be retracted such that the body is a shorter distance from the attachment device. The retractable attachment device may be a self-retracting line.

At least one of the connector first side and the connector second side may be magnets. The second part may attach to the safety belt by wrapping around the safety belt and securing to itself. The second part may secure to itself via hook and loop fastener. The seat may be part of an infant car seat or an infant carrier and the structure may be a handle. The safety belt may be part of a five point harness system. The seat may be part of a child stroller.

In a second embodiment, the safety belt holder may be for use with an infant car seat with at least one safety belt and a handle, and the safety belt holder may comprise: a hook for attaching the safety belt holder to the handle; a retractable attachment device attached to the hook; a body attached to the retractable attachment device; a connector first side attached to or embedded within the body; and a connector second side attached to a strip, where the connector second side is removably attachable to the connector first side and where the strip is capable of being wrapped around the safety belt and secured to itself.

A method of holding a safety belt out of a seat associated with the safety belt while placing a person in the seat may comprise the steps of: attaching a safety belt holder body to a structure adjacent the seat, where the safety belt holder body has a connector first side; attaching a connector second side to the safety belt, where the connector second side is removably attachable to the connector first side; attaching the connector second side to the connector first side to hold the safety belt out of the seat; placing the person in the seat; detaching the connector second side from the connector first side; and using the safety belt. The safety belt holder body may be attached to the structure via a retractable attachment device, and the method may further comprise extending the retractable attachment device prior to attaching the safety belt holder to the structure and retracting the retractable attachment device after attaching the connector second side to the connector first side.

DETAILED DESCRIPTION OF THE INVENTION

Figure 1:
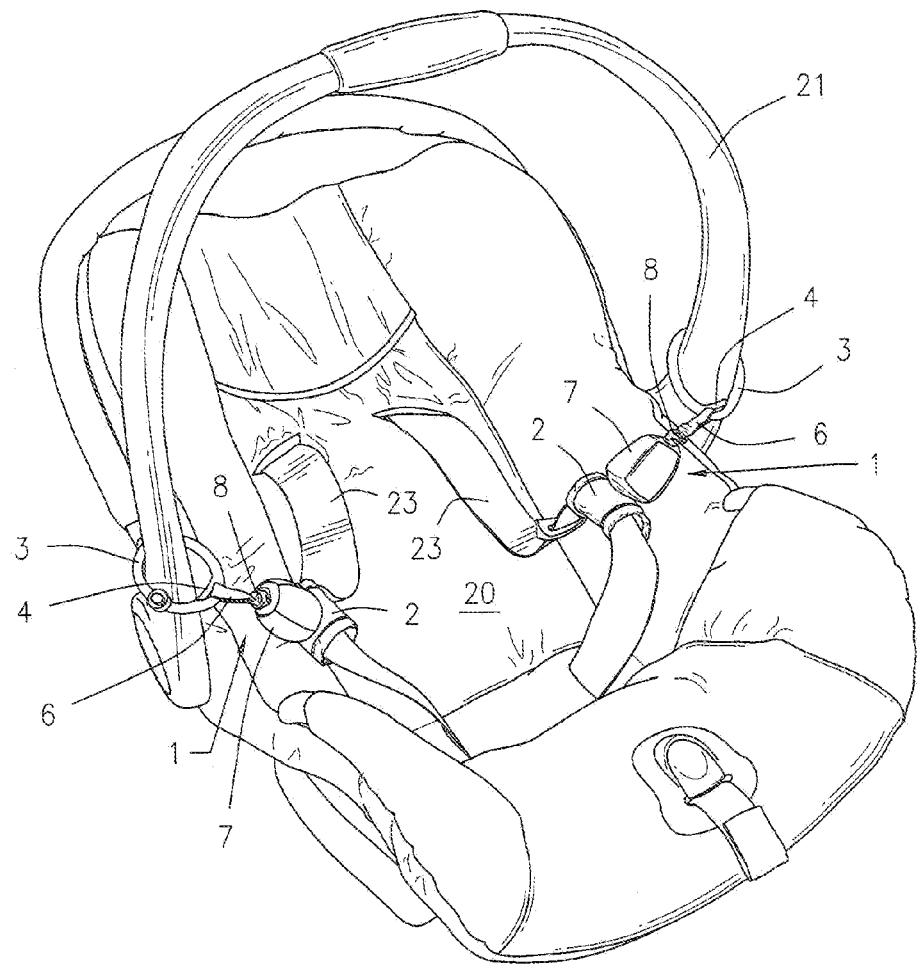
FIG. 1 is a perspective view of an infant car seat with the safety belt holder of the present invention in place thereon.

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a magnetized safety belt holder for use with an infant car seat 20 with a collapsible handle 21, an infant carrier, or a child stroller. As seen in FIGS. 1 through 4, the safety belt holder comprises two main components: the first part 1 attaches to the handle 21 or other structure located on either side of the seat 20 and the second part 2 attaches to the safety belt 23 itself. The first part 1 and the second part 2 are removably attachable to each other.

Figures 2, 3:
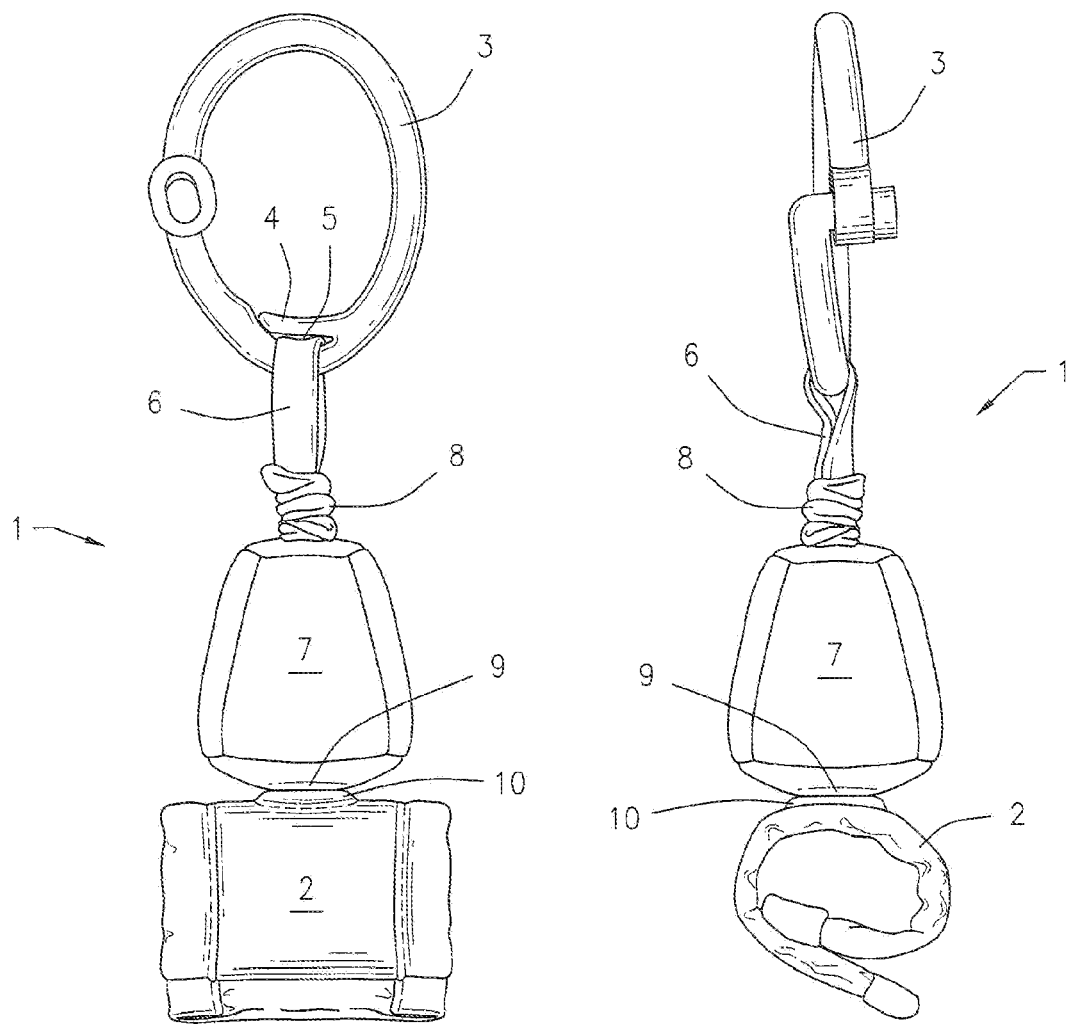
FIG. 2 is a front view of the safety belt holder.
FIG. 3 is a side view of the safety belt holder.
Figure 4:
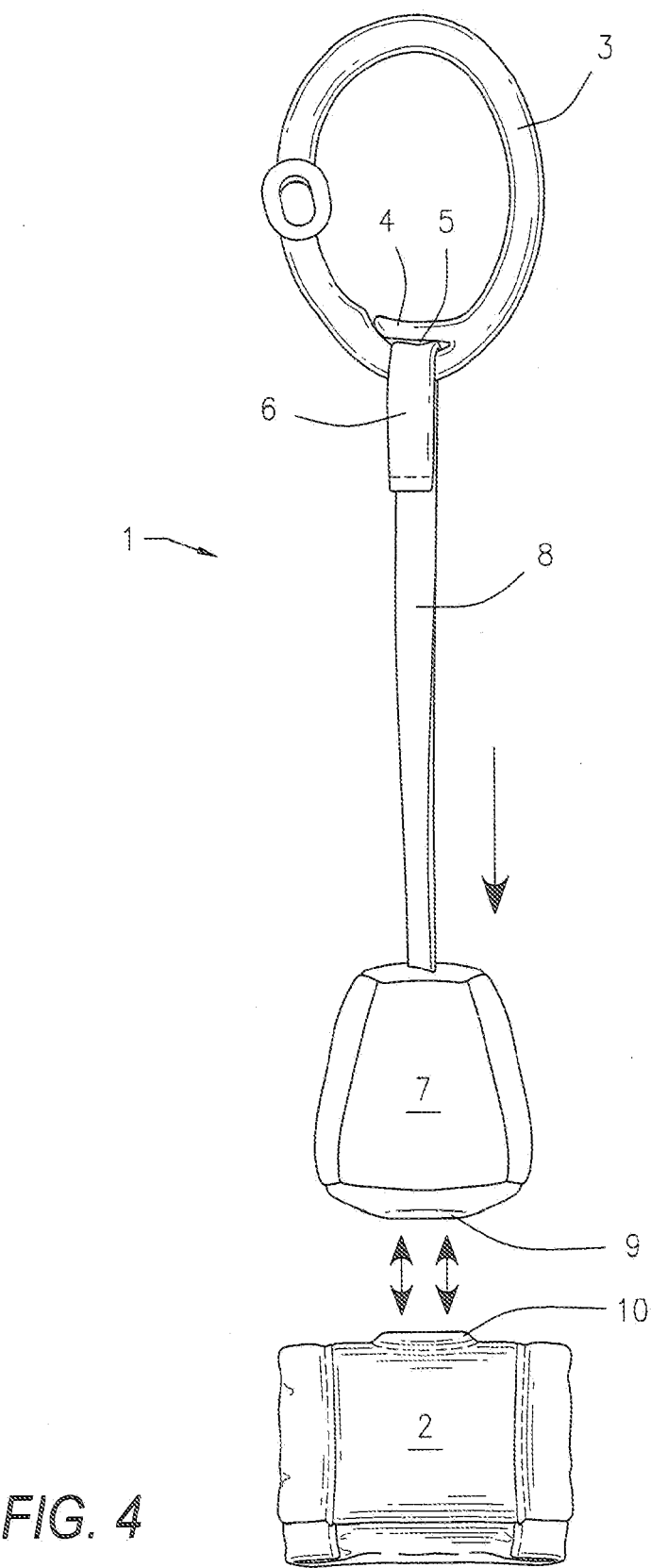
FIG. 4 is a front view of the safety belt holder with the retractable attachment device extended and the second part detached from the first part.
Figure 9:
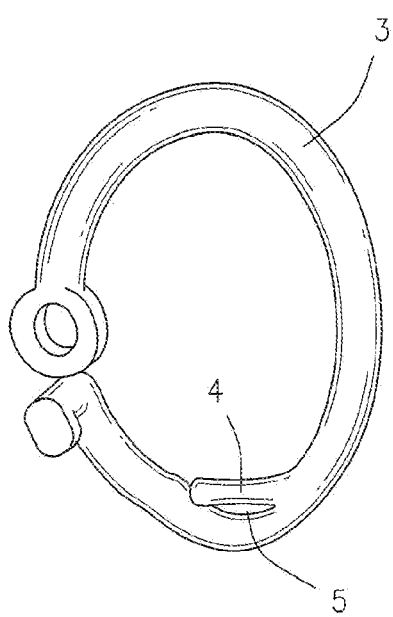
FIG. 9 is a front view of one embodiment of the hook.
Figure 10:
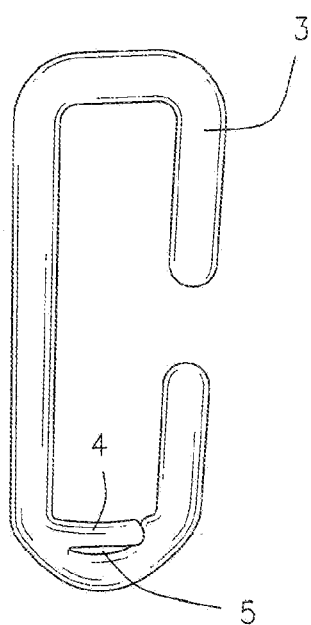
FIG. 10 is a front view of a second embodiment of the hook.

The first part 1 may attach to the handle or other structure 21 via a hook 3. The hook 3 may be generally oval shaped, as seen in FIG. 9, or generally rectangular, as seen in FIG. 10. The shape of the hook 3 may be dependent on the shape of the handle or other structure 21, and may be sufficiently sized such that it may slide along the handle or other structure 21 but may not rotate freely thereupon. The hook 3 may have a projection 4 forming a groove 5, into which a hook attachment device 6 connected to the first part 1 may fit. The hook attachment device 6 may be a fabric loop attached to the first part 1, as seen in FIGS. 2 through 4. The groove 5 may be located such that the hook attachment device 6 is held to the front of the handle or other structure 21. This prevents the first part 1 from sliding to the inside of the handle or other structure 21.

As seen in FIGS. 2 through 4, the body 7 of the first part 1 may attach to the hook attachment device 6 via a retractable attachment device 8. The retractable attachment device 8 may be a self-retracting line or belt, similar to a retractable seatbelt or retractable lanyard, made of an elastic material, or any other device that can be extended from a retracted position and will then return to the retracted position when pressure is removed therefrom. FIGS. 2 and 3 show the retractable attachment device 8 in a retracted position, while FIG. 4 shows the retractable attachment device 8 in a fully extended position.

The body 7 of the first part 1 may have a connector first side 9. The connector first side 9 may be embedded within the body, as shown in FIGS. 2 through 4, or may be attached thereto. The connector first side 9 may be a magnet, as shown, or other suitable connection device.

The connector first side 9 may removably attach to a connector second side 10, which is part of the second part 2. The connector second side 10 may be compatible with the connector first side 9, such that the connector second side 10 and the connector first side 9 may be removably connected. The connector second side may be embedded within the second part 2, as shown in FIGS. 2 through 8, or may be attached thereto. The connector second side 10 may be a magnet, as shown, or other suitable connection device. FIGS. 2 and 3 show the second side 2 connected to the first side 1, while FIG. 4 shown the second side 2 detached from the first side 1.

Figure 5:
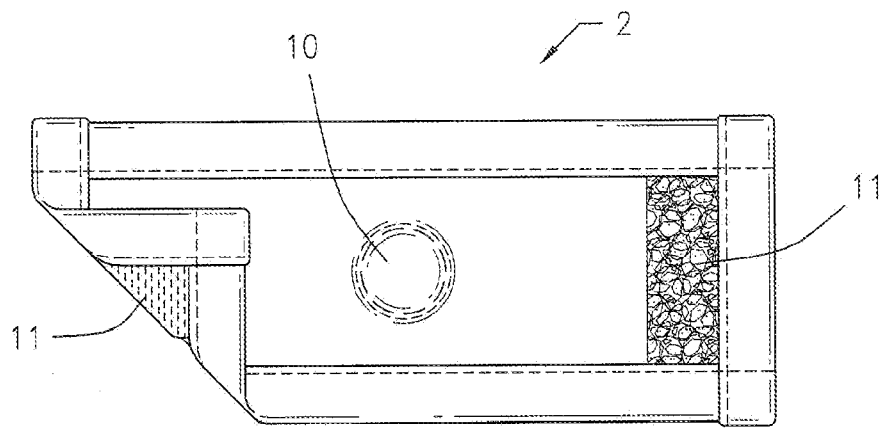
FIG. 5 is a front view of the second part unrolled, with one corner folded pack to show both sides of the hook and loop closure thereon.
Figure 6:
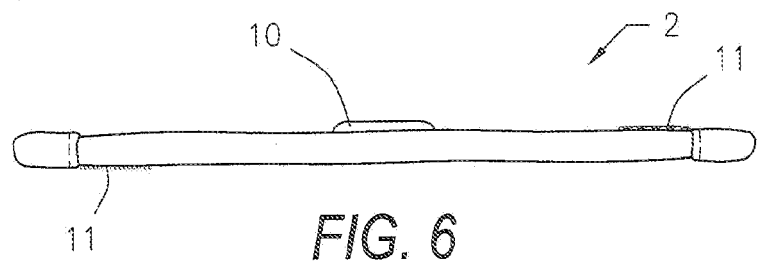
FIG. 6 is a side view of the second part unrolled.
Figure 7:
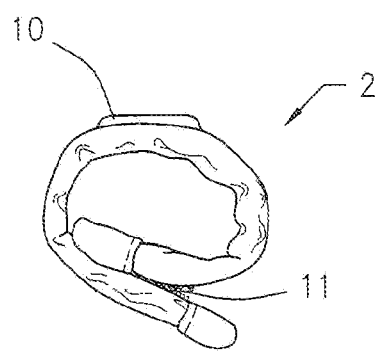
FIG. 7 is a side view of the second part rolled and secured to itself.
Figure 8:
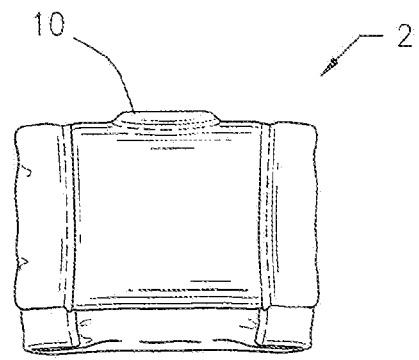
FIG. 8 is a side view of the second part rolled and secured to itself.

The second part 2 may attach to the safety belt 23 by any suitable means. For example, the second part 2 may wrap around the safety belt 23 and attach to itself via hook and loop fastener 11, as shown in FIG. 1. FIGS. 5 and 6 show the second part 2 extended out, as when not in use, and FIGS. 7 and 8 show the second part 2 rolled up and attached to itself, as it would be in use when wrapped around the safety belt 23.

In use, a user attaches the first part 1 to the handle or other structure 21 via the hook 3. The user attaches the second part 2 to the safety belt 23. The user attaches the second part 2 to the first part 1 via the connector first side 9 and connector second side 10, thus bringing the safety belt 23 to the side of the seat 20 and out of the way of placing the child in the seat 20. If the first part 1 incorporates a retractable attachment device 8, the first part 1 may be extended toward the safety belt 23 to aid in attaching the second part 2 to the first part 1, then retracted to pull the safety belt 23 out of the way. Once the child is in place in the seat 20, the second part 2 is removed from the first part 1 to allow the safety belt 23 to be secured over the child according to its typical use. Another safety belt holder may be used on the opposite side of the safety belt 23, allowing both sides to be held out of the way while placing the child in the seat 20.

The safety belt holder may be used on an infant car seat with a collapsible handle, an infant carrier, a child stroller, or any other device incorporating a seat, a safety belt, and a structure to each side of the seat to which the seat belt holder can be attached. As strollers typically do not have handles similar to those of carriers, the handle or other structure 21 to which the first part 1 is attached may be an element of the stroller, such as a portion of its frame.

Whereas, the devices and methods have been described in relation to the drawings and claims, it should be understood that other and further modifications, apart from those shown or suggested herein, may be made within the spirit and scope of this invention.

What is claimed is:

1. A safety belt holder system for holding a safety belt out of a seat associated with the safety belt, where the seat has a first side and a second side and where the safety belt is located on the first side, the safety belt holder system comprising:
    the seat with the first side and the second side;
    the safety belt associated with the seat and located on the first side of the seat;
    a first part, where the first part comprises:
        an attachment device for attaching the first part to a structure adjacent the seat on the first side of the seat, where the attachment device is a hook;
        a body attached to the attachment device, where the hook has a projection forming a groove such that the body may attach to the hook via a hook attachment device that fits within the groove such that the hook attachment device cannot slide along the hook; and
        a connector first side attached to or embedded within the body; and
    a second part, where the second part is attachable to the safety belt and where the second part comprises a connector second side, which is removably attachable to the connector first side, such that the safety belt holder is capable of holding the safety belt out of the seat to the first side when the second part is attached to the first part;
    where the body of the first part is not attached to the attachment device of the first part via the connector second side of the second part.

2. The safety belt holder of claim 1 where the hook is sized and shaped such that it may slide along the structure but cannot rotate freely upon the structure.

3. The safety belt holder of claim 1 where the hook attachment device is a fabric loop.

4. The safety belt holder of claim 1, further comprising a retractable attachment device such that the body attaches to the attachment device via the retractable attachment device, where the retractable attachment device may be extended such that the body is a longer distance from the attachment device or may be retracted such that the body is a shorter distance from the attachment device.

5. The safety belt holder of claim 4 where the retractable attachment device is a self-retracting line.

6. The safety belt holder of claim 1 where at least one of the connector first side and the connector second side are magnets.

7. The safety belt holder of claim 1 where the second part attaches to the safety belt by wrapping around the safety belt and securing to itself.

8. The safety belt holder of claim 7 where the second part secures to itself via hook and loop fastener.

9. The safety belt holder of claim 1 where the seat is part of an infant car seat or an infant carrier.

10. The safety belt holder of claim 9 where the structure is a handle.

11. The safety belt holder of claim 9 where the safety belt is part of a five point harness system.

12. The safety belt holder of claim 1 where the seat is part of a child stroller.

13. A safety belt holder system for use with an infant car seat with at least one safety belt and a handle, where the seat has a first side and a second side and the safety belt is located on the first side, the safety belt holder system comprising:
   the infant car seat with the safety belt and the handle, where the seat has the first side and the second side and the safety belt is located on the first side;
   a hook for attaching the safety belt holder to the handle adjacent the first side of the seat;
   a retractable attachment device attached to the hook;
   a body attached to the retractable attachment device, where the hook has a projection forming a groove such that the body may attach to the hook via the retractable attachment device, which fits within the groove such that the retractable attachment device cannot slide along the hook;
   a connector first side attached to or embedded within the body; and
   a connector second side attached to a strip, where the connector second side is removably attachable to the connector first side and where the strip is capable of being wrapped around the safety belt and secured to itself, such that the safety belt holder is capable of holding the safety belt out of the seat to the first side when the second part is attached to the first part.

14. A method of holding a safety belt out of a seat associated with the safety belt while placing a person in the seat, the method comprising the steps of:
   attaching a safety belt holder body to a structure adjacent the seat via a hook with a projection forming a groove such that the safety belt holder body may attach to the hook via a hook attachment device that fits within the groove such that the hook attachment device cannot slide along the hook, where the safety belt holder body has a connector first side;
   attaching a connector second side to the safety belt, where the connector second side is removably attachable to the connector first side and where the safety belt holder body is not attached to the structure adjacent the seat via the connector second side;
   attaching the connector second side to the connector first side to hold the safety belt out of the seat;
   placing the person in the seat;
   detaching the connector second side from the connector first side; and
   using the safety belt.

15. The method of claim 14 where the safety belt holder body is attached to the structure via a retractable attachment device, the method further comprising the steps of:
   extending the retractable attachment device prior to attaching the safety belt holder to the structure; and
   retracting the retractable attachment device after attaching the connector second side to the connector first side.

16. The safety belt holder of claim 1 where the seat further comprises a second safety belt located on the second side of the seat, the safety belt holder further comprising:
   a second first part, where the second first part comprises:
      a second attachment device for attaching the second first part to a structure adjacent the seat on the second side of the seat;
      a second body attached to the second attachment device; and
      a second connector first side attached to or embedded within the second body; and
   a second second part, where the second second part is attachable to the second safety belt and where the second second part comprises a second connector second side, which is removably attachable to the second connector first side, such that the safety belt holder is capable of holding the second safety belt out of the seat to the second side when the second second part is attached to the second first part.

* * * * *